(12) United States Patent
Yeh

(10) Patent No.: US 7,784,801 B2
(45) Date of Patent: Aug. 31, 2010

(54) BRAKE UNIT FOR A BABY STROLLER

(75) Inventor: Chuan-Ming Yeh, Chuayi (TW)

(73) Assignee: Link Treasure Limited, Tortola (VG)

( * ) Notice: Subject to any disclaimer, the term of this patent is extended or adjusted under 35 U.S.C. 154(b) by 689 days.

(21) Appl. No.: 11/654,560

(22) Filed: Jan. 18, 2007

(65) Prior Publication Data

US 2007/0170675 A1 Jul. 26, 2007

(30) Foreign Application Priority Data

Jan. 20, 2006 (TW) .............................. 95201415 U

(51) Int. Cl.
*B62B 9/08* (2006.01)
(52) U.S. Cl. ..................... 280/47.38; 280/658; 188/20
(58) Field of Classification Search .............. 280/47.38, 280/642, 647, 650, 657, 658; 188/19, 20
See application file for complete search history.

(56) References Cited

U.S. PATENT DOCUMENTS 5,346,039 A * 9/1994 Pfisterer ..................... 188/2 F
5,370,408 A * 12/1994 Eagan .................... 280/33.994
5,927,441 A * 7/1999 Luo ............................ 188/19
6,216,825 B1 * 4/2001 Hung ....................... 188/24.22
6,298,949 B1 * 10/2001 Yang et al. .................... 188/20
2005/0217409 A1 * 10/2005 Andersson et al. ......... 74/502.2

FOREIGN PATENT DOCUMENTS

| GB | 2403519(A) | 1/2005 |
|---|---|---|
| GB | 2431443(A) | 4/2007 |
| TW | 288611 Y | 3/2006 |

* cited by examiner

*Primary Examiner*—Frank B Vanaman
(74) *Attorney, Agent, or Firm*—Muncy, Geissler, Olds & Lowe, PLLC

(57) ABSTRACT

A brake mechanism for a baby stroller has a wheel brake device, a connecting element, an actuator and a retainer. The wheel brake device is operatively connected to a wheel set of the stroller. The actuator is controllable connected to the upper portion of the stroller for driving the wheel brake device via the connecting element to brake the wheel of the stroller. The retainer is used to engage with the actuator to keep the actuator in a locked position.

7 Claims, 4 Drawing Sheets

BRAKE UNIT FOR A BABY STROLLER

FIELD OF THE INVENTION

This invention relates to a brake unit and, more particularly, to a brake mechanism which is control by an actuator mounted on the handle portion of a stroller.

DESCRIPTION OF THE RELATED ART

A regular stroller frame generally has a pair of push arms for a user to push the stroller forward. Normally, the push arms are fixed behind the stroller, thereby forcing the user to push the stroller from the rear side. Further, a pair of brake devices are normally equipped on the rear wheel sets with a control bar which is operable either by the user's hand or feet, to stop the stroller.

To reach the control bar of the brake device by hands, the user has to bend down and thus may need to clean their hand if the control bar was not clean. In order to shift the control bar of the brake device by feet, the user has to locate the position of the control bar.

Sometimes, the control bar may be hidden behind a laid-down backrest or basket behind the stroller, therefore it is difficult to make sure if the wheels are braked. Furthermore, the user may also get confused about which side and which wheel has been braked.

SUMMARY OF THE INVENTION

In order to resolve the above-mentioned inconvenience, the present invention provides a brake unit for a stroller that allows the users to manipulate and brake the stroller without bending or get their hand dirtied by a soiled control bar as mentioned above.

According to the present invention, a brake unit comprises an actuator, a connecting element and a wheel brake device. The actuator is operatively connected with the upper portion of a stroller frame, having a control element and a retainer.

The control element is movably connected to the stroller frame for driving the wheel brake device via the connecting element, to cause the wheel brake device to move into either a braked position or a released position. Further, the actuator is retainable by the retainer in a locked position thereby to brake the stroller continually.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENT

Figure 1:
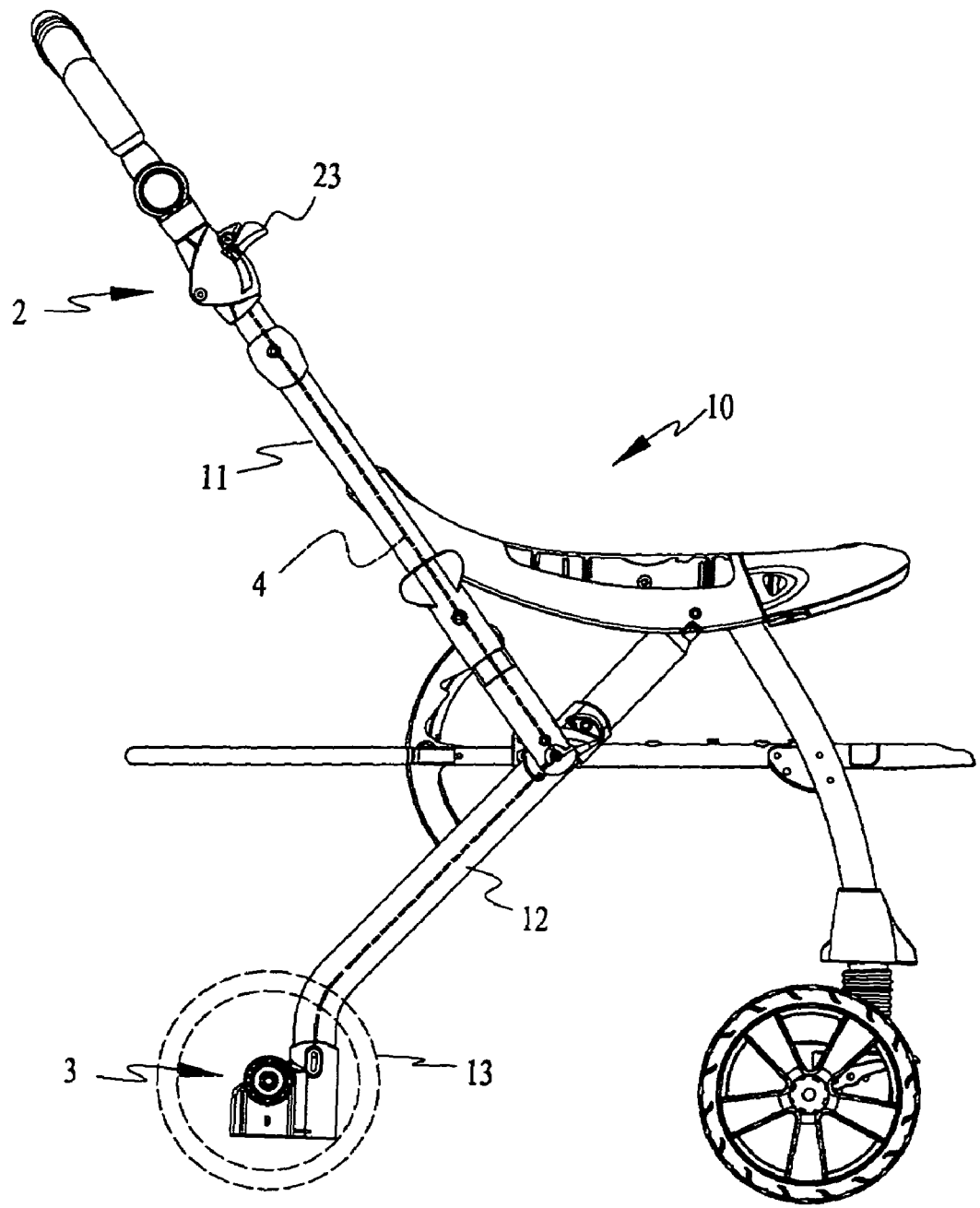
FIG. 1 is a side view of a stroller frame with a brake unit according to the present invention, wherein the push arms of the stroller are controllably connected with an actuator for controlling the wheel brake device via a connecting element.

Referring to FIG. 1, an embodiment of a brake unit equipped on a stroller according to the present invention is shown. The stroller frame 10 has a collapsible linkage system which can be fixed in a deployed configuration or foldable to a collapsed configuration. The stroller frame 10 includes a pair of push arms 11 pivoted with a rear leg tube 12. The rear leg tube 12 connects to a wheel set 13 equipped with a wheel brake device 3.

The brake unit of this embodiment comprises an actuator 2, a connecting element 4 and a wheel brake device 3. The actuator 2 is controllably connected with the upper portion of a stroller frame 10.

The control element is movably connected to the stroller frame 10 for driving the wheel brake device 3 via the connecting element 4, thereby to cause the wheel brake device 3 to move into either a braked position or a released position.

Figure 2:
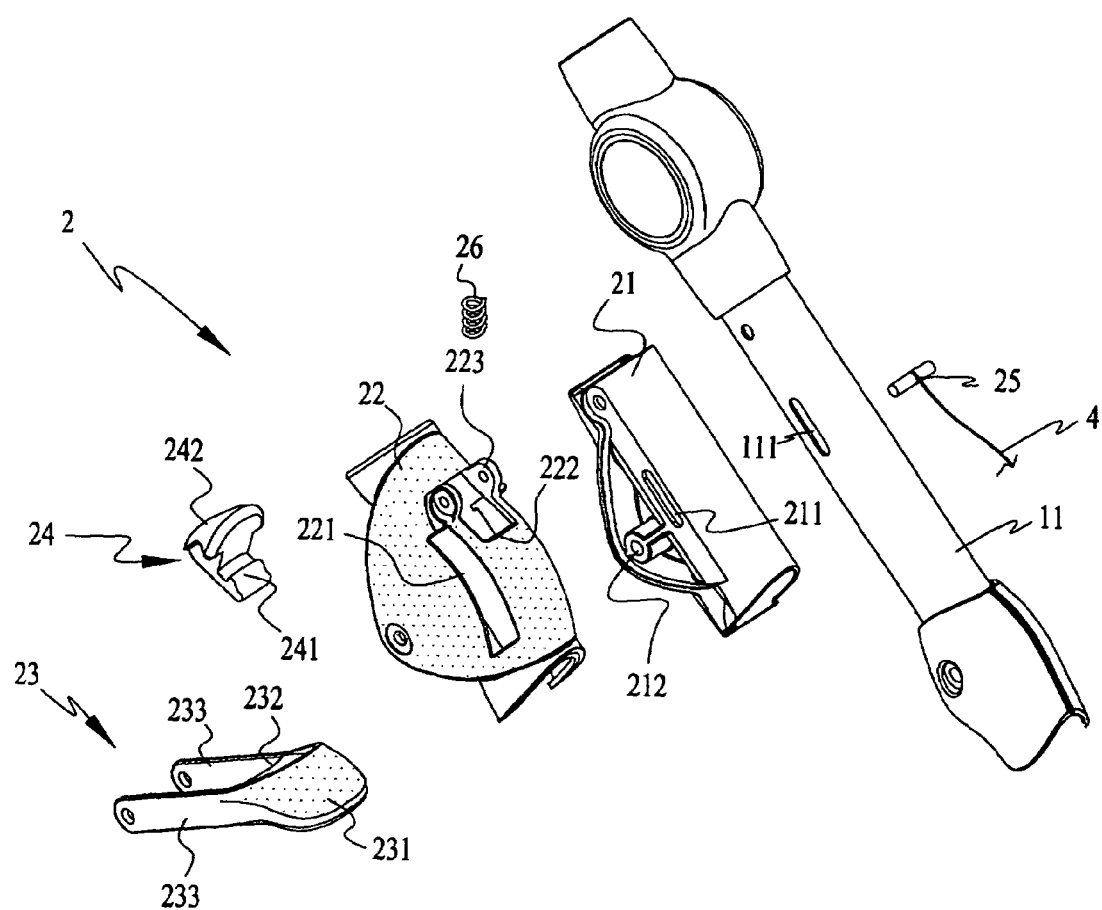
FIG. 2 is a perspective exploded view showing the actuator according to the present invention.

Referring to FIG. 2, the actuator 2 is controllably connected to the push bar 11 and includes a holding base 21, a housing 22, a control element 23, a retainer 24, a pin 25, and a resilient element 26. The push bar 11 has a slot 111 for receiving and guiding the pin 25. The holding base 21 is fixed to the push bar 11 and has a slot 211 and a pivot point 212. The slot 211 is aligned to the slot 111 of the push bar 11 for guiding the pin 25 when the pin 25 is carried by the control element 23 and moves therein reciprocally.

The housing 22 is connected with the holding base 21 and has an opening 221 and a pivotal space 222. The pivotal space 222 is formed with a pivot point 223 and a recess or an opening for pivotally receiving the retainer 24. The retainer 24 is biased by the resilient element 26 so as to reciprocally rotate about the pivot point 223.

The control element 23 has an end portion 231, an engaging portion 232 and a pair of arms 233. The pair of arms 233 is pivotally connected to the holding base 21 at the pivot point 212 through the opening 221 of the housing 22. In this embodiment, the end portion 231 and the pair of arms 233 are formed integrally with a metal or plastic material. The end portion 231 provides a surface for the user to contact and manipulate the control element 23. The control element 23 connects the connecting element 4 via the pin 25 and carries the pin 25 within the slots 111 and 211 reciprocally to pull the connecting element 4. The connecting element 4 may be a flexible element, such as a wire or cable.

Figure 3:
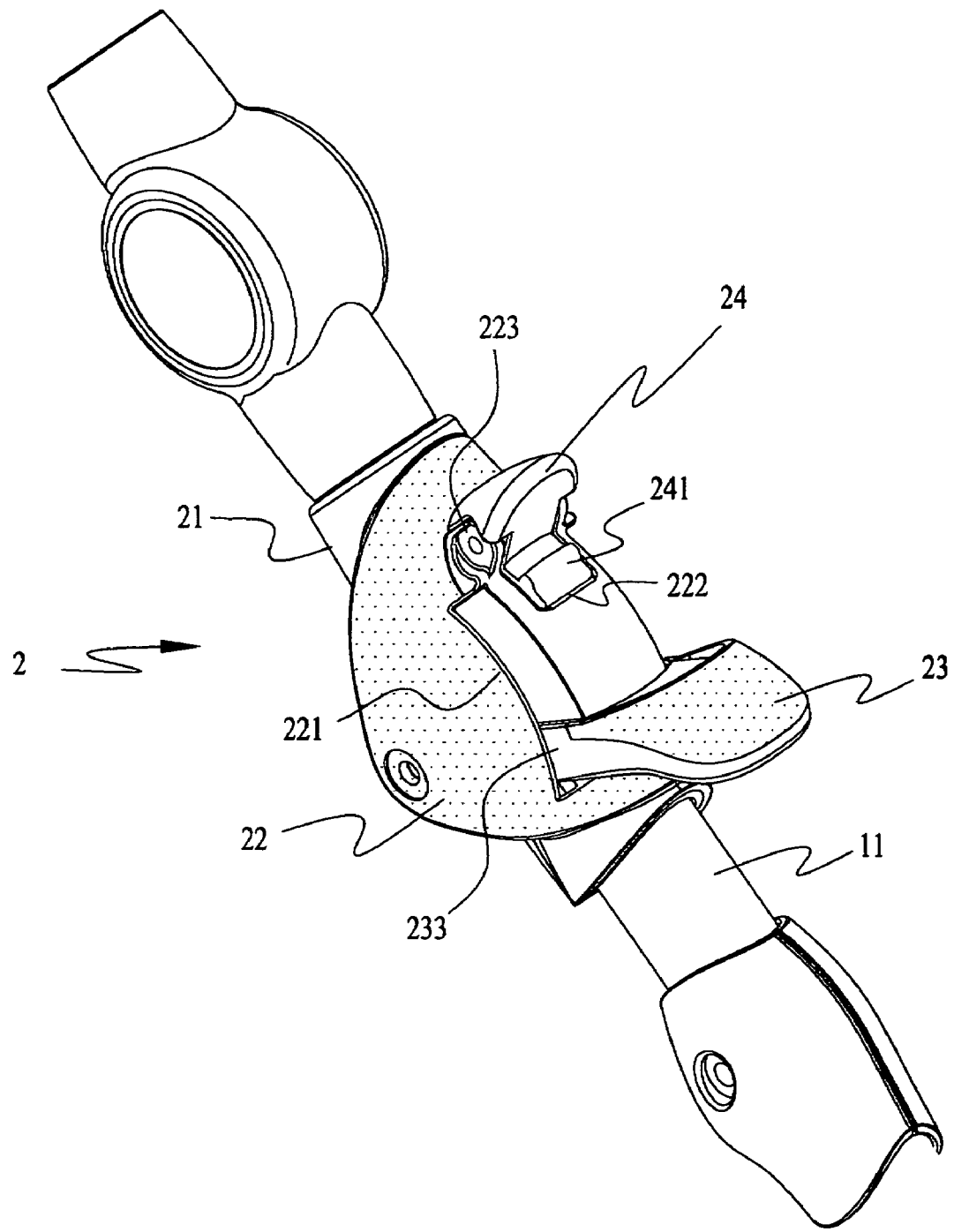
FIG. 3 is an perspective view schematically showing the actuator in a released position.

Referring to FIGS. 2 and 3, the retainer 24 has an angled surface 242 for fingers to touch and a protruded portion 241 for engaging with the engaging portion 232. The retainer 24 is pivotally received within the pivotal space 222 and biased by the resilient element 26 upwardly.

Figure 4:
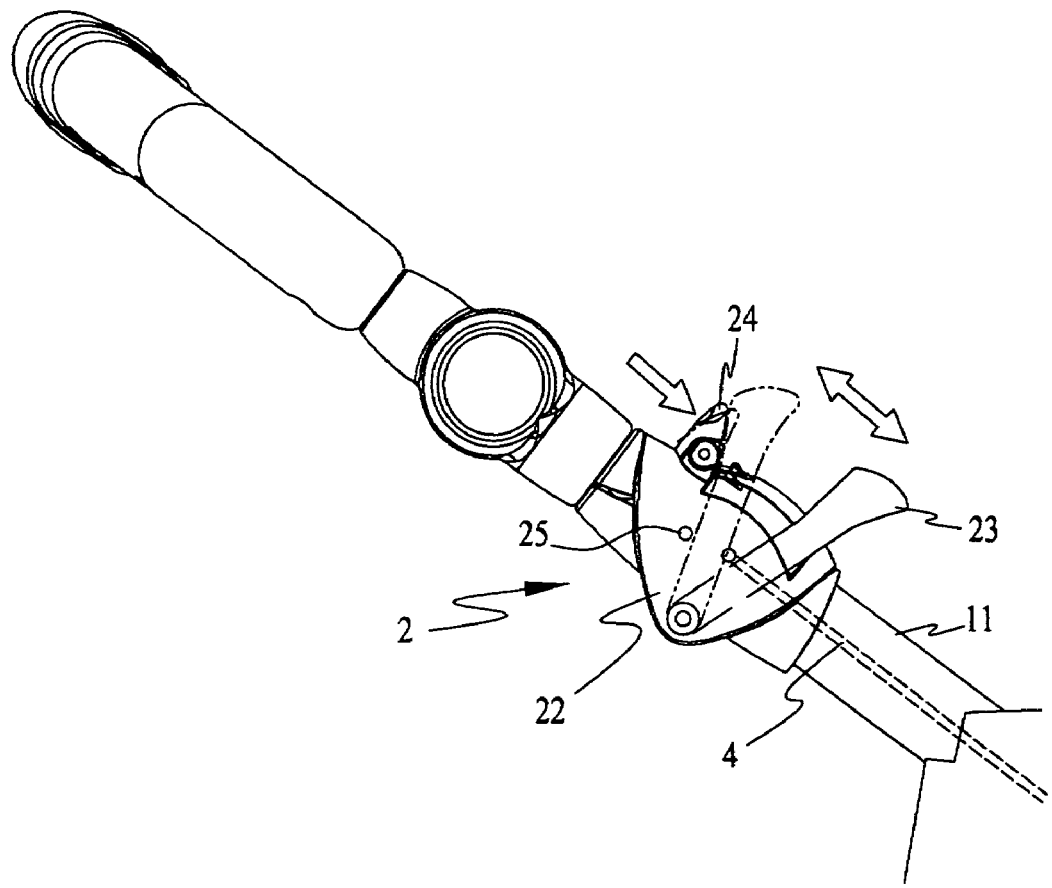
FIG. 4 is a side view schematically showing the actuator retained by a retainer in a locked position.

Referring to FIG. 4, when the protruded portion 241 is engaged with the engaging portion 232, the control element 23 is locked and the connecting element 4 pulls the wheel brake device 3 into a brake position. When the angled surface 242 is pressed, the retainer 24 is forced to rotate against the biasing from a resilient element (not shown), thereby to release the control element 23 and the wheel brake device 3.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A brake unit for a baby stroller, comprising:
    a wheel brake device, connected to a wheel set of the baby stroller;
    a connecting element, controllably connected to the wheel brake device;
    a push bar of the baby stroller having a slot for guiding a pin;
    an actuator, movably connected to the push bar for driving the wheel brake device via the connecting element to brake the wheel set;
    a retainer, separably engageable with the actuator to keep the actuator in a position for keeping the wheel brake device in a braked position;
    a housing, having a pivotal space for pivotally receiving and connecting the retainer;
    a resilient element, received in the pivotal space for biasing the retainer upwardly;
    a control element connected with the connecting element via the pin; and
    a holding base connected to the push bar, having a pivotal point for pivotally connecting with the control element, and formed with a slot aligned to the slot of the push bar for guiding the pin.

2. The brake unit for a baby stroller as claimed in claim 1, wherein said actuator is connected to a push bar of an upper portion of a frame of the stroller.

3. The brake unit for a baby stroller as claimed in claim 1, wherein the retainer has a protruded portion for engaging with the control element, to keep the control element in a locking position.

4. The brake unit for a baby stroller as claimed in claim 1, wherein the retainer has an angled surface for a user to touch with fingers.

5. The brake unit for a baby stroller as claimed in claim 1, wherein the control element is formed with a pair of arms for pivotally connecting to the holding base, and has an end portion for a user to touch and manipulate the control element.

6. The brake unit for a baby stroller as claimed in claim 5, wherein the housing further has an opening for the pair of arms to pass through to pivot with the holding base.

7. The brake unit for a baby stroller as claimed in claim 1, wherein the connecting element is a wire or a cable.

* * * * *